United States Patent [19]

Lachman et al.

[11] Patent Number: 4,912,077

[45] Date of Patent: Mar. 27, 1990

[54] CATALYTICALLY ACTIVE MATERIALS AND METHOD FOR THEIR PREPARATION

[75] Inventors: Irwin M. Lachman; Mallanagouda D. Patil, both of Corning; Jimmie L. Williams; Raja R. Wusirika, both of Painted Post, all of N.Y.

[73] Assignee: Corning Incorporated, Corning, N.Y.

[21] Appl. No.: 219,985

[22] Filed: Jul. 15, 1988

[51] Int. Cl.$^4$ .................. B01J 23/40; B01J 23/48; B01J 35/04
[52] U.S. Cl. .................. 502/302; 502/305; 502/319; 502/321; 502/324; 502/325; 502/330; 502/337; 502/338; 502/339; 502/344; 502/345; 502/347; 502/349; 502/350; 502/353; 502/439; 502/527
[58] Field of Search .............. 502/347, 439, 527, 302, 502/305, 319, 321, 324, 325, 337, 338, 339, 344, 345, 349, 350, 353, 330; 423/215.5

[56] References Cited

U.S. PATENT DOCUMENTS

| | | | |
|---|---|---|---|
| 4,337,028 | 6/1982 | Angwin et al. | 502/324 X |
| 4,521,532 | 6/1985 | Cho | 502/439 |
| 4,637,995 | 1/1987 | DeAngelis et al. | 502/527 X |
| 4,663,300 | 5/1987 | Lester et al. | 502/66 |
| 4,690,913 | 9/1987 | Nojiri et al. | 502/347 X |
| 4,743,577 | 5/1988 | Schroeder et al. | 502/326 |

*Primary Examiner*—W. J. Shine
*Attorney, Agent, or Firm*—Charles Q. Buckwalter, Jr.; Richard N. Wardell

[57] ABSTRACT

This invention is directed to the preparation of articles exhibiting catalytic activity and, in particular, to articles which are exceptionally suitable for catalytically converting gases from organically fueled power plants, internal combustion engines, and other fluid and gaseous catalysis. The inventive articles comprise a unitary composite structure consisting essentially of a catalytically active precious metal and/or a base metal which, the base metals in particular, become catalytically active upon oxidation. The catalysts are integrally combined with a supporting structural metal.

16 Claims, No Drawings

CATALYTICALLY ACTIVE MATERIALS AND METHOD FOR THEIR PREPARATION

RELATED APPLICATION

U.S. application Ser. No. 219,984, filed concurrently herewith by T. P. DeAngelis, I. M. Lachman, and R. R. Wusirika under the title CATALYST-AGGLOMERATE BODIES ENCAPSULATED IN A STRUCTURE, discloses the production of unitary composite articles consisting essentially of catalyst-agglomerate bodies integrally combined with a supporting structural material.

BACKGROUND OF THE INVENTION

The present invention relates to the fabrication of hard porous catalytically active bodies particularly suited as filter media, substrates and/or as catalytic converters for liquids and gases. These bodies may be advantageously used in oxidizing, or in the alternative, reducing environments, and in thermally and mechanically stressful environments. The bodies are prepared by sintering together metal particles, which are an intermix of catalytic metal precursors and structural metals and/or alloys thereof Ceramic structural materials may also be advantageously mixed with the metal particles to produce similar benefits A preferred embodiment of the invention comprises the extrusion of metal particles into porous honeycomb structures that can perform as filters and selectively, catalytically convert noxious exhaust gases into their innocuous states The inventive compositions are directed to be particularly advantageous in the exhaust stream of organically fueled power plants, internal combustion engines, and when used as filters, diesel particulate filters and molten metal filters.

Common to the combustion of organically fueled power plants are the resultant waste NOx and SOx gases. These gases, variously derived, have been accused of ultimately causing pollution problems related to acid rain. In order to abate the widespread effects of NOx and SOx gases, catalytically active substrates are proposed as a remedy for this pollution problem. Generally, the substrate of choice has been a ceramic which is capable of being extruded, can withstand thermal and mechanical shocks, and is capable of being joined with metal oxides that exhibit catalytic activity toward NOx or SOx.

In U.S. Pat. No. 4,758,272, filed May 27, 1987 by K. D. Pierotti and R. R. Wusirika under the title POROUS METAL BODIES herein incorporated by reference as filed, is disclosed a porous metal body comprised of an iron and aluminum alloy composition. The body is extruded from metal powders, formed into a substrate, and subsequently sintered to form a hard porous structure. The resultant product is not catalytically active, but must be joined with a catalyst to provide a catalytic surface for gases and liquids.

Therefore, the primary objective of the present invention was to prepare a porous metallic or ceramic body exhibiting catalytic activity when contacted with gas and/or fluid effluents. A more specific objective of the present invention was to prepare a porous metallic or ceramic body capable of catalytically converting noxious exhaust gases from organically fueled power plants and exhaust gases from internal combustion engines, into their innocuous states.

SUMMARY OF THE INVENTION

We have found that those objectives and others that will be illustrated below can be accomplished by preparing a unitary composite structure exhibiting catalytic activity consisting essentially of a single and/or a plurality of catalytically active precious metals and/or base metals, said base metals become catalytically active upon oxidation, said precious and/or base metals are integrally combined with a supporting sintered structure. The catalytically active metal may be uniformly dispersed within and without, or otherwise integrally combined with, a metallic or ceramic supporting structural material Two different types of catalytically active metals have been found to be operable in preparing the inventive composite bodies, some of which are especially effective in converting noxious exhaust gases from internal combustion engines into an innocuous state. Such gases typically include carbon containing gases, CO, and NOx. The integral catalyst support structure may advantageously be placed in any reactive vessel where catalysis aids a chemical reaction. The porosity of the structure and the surface dispersion of the catalyst provides ample opportunity for reactant catalysis. Since a broad range of catalysts can be incorporated into the sintered body, the structure can be designed for any reactive system. For example, to further oxidize SOx commonly found in the exhaust path of organically fueled power plants. Additionally, NOx can be reduced in the same exhaust path of organically fueled power plants.

The catalytic activity of the precious metals selected from the group consisting of gold, iridium, osmium, palladium, platinum, rhenium, rhodium, ruthenium, silver, and mixtures thereof is well recognized in the art. The metals may be employed in their elemental form or as a compound in an amount calculated to yield the desired concentration of metal. Compounds of rhodium, palladium, and platinum have been found to be particularly effective in their catalytic action with respect to exhaust gases emanating from internal combustion engines, for example carbonaceous gases such as hydrocarbons.

The catalytic activity of various base metal oxides and/or sulfides for a variety of reactions is also well known to the art. The metals included in the catalytically active metal oxides are chromium, cobalt, copper, iron, manganese, molybdenum, nickel, niobium, tantalum, titanium, tungsten, vanadium, zinc, zirconium, rare earth metals and alloys therebetween, and mixtures thereof Those metals in their oxide and/or sulfide forms can exercise their catalytic activity with equal effectiveness in the composite bodies of the present invention. Any means of oxidizing the base metals can be employed, commonly oxidizing agents such as strong mineral acids, bleach, hydrogen peroxide, chlorine gas, oxygen, and perchlorate to name a few.

In like manner to the precious metals, the base metals can be utilized in their elemental form or as a compound in a concentration calculated to provide the desired amount of metal. Impurities frequently found in such metals, e.g., silicon, phosphorous, carbon, and sulfur, or some combination thereof, may be present at levels as high as 10% by weight without deleteriously affecting the catalytic activity of the composite body.

In general, the supporting structural metals will be those metals of commerce commonly employed for that purpose, for example, aluminum, iron, nickel, steel (300 and 400 series), titanium, stainless steel, and various alloys of those metals with one another or with other metals such as are present in stainless steels. One especially useful group of supporting structural metals is disclosed in U.S. Pat. No. 4,758,272, supra. The metals disclosed therein consisted essentially, as analyzed in weight percent, of at least 80% aluminum and iron, with no more than about 1% of an alkaline earth metal consisting of magnesium and/or calcium. Preferred metal compositions consisted essentially, as analyzed in weight percent, of about 50-90% iron, 5-30% aluminum, and no more than about 1% magnesium and/or calcium, with useful optional additions of up to 20% total of at least one metal in the indicated proportion of up to 10% tin, up to 10% copper, and up to 10% chromium. The alkaline earth metals are optional components when the body is sintered to the exclusion of oxygen.

Examples of useful ceramic batch materials for use as a structural matrix are cordierite, mullite, alumina, lithium aluminosilicates, titania, zircon, feldspars, quartz, fused silica, kaolin clay, aluminum titanate, silicates, aluminates, and mixtures thereof.

Whereas the inventive method generally contemplates a composite body consisting essentially of at least two constituents, i.e., a catalytically active metal and a supporting structural ceramic, metals, or even a single metal, e.g., iron, nickel or titanium, can perform both functions in the proper environment.

In the most general terms, the catalytically active metal and the structural element are brought together in a manner designed to uniformly disperse the catalytically active metal throughout at least a portion of, and normally the entire body of, the supporting structural material. That mixture is formed into a shape of a desired configuration and that shape is thereafter sintered to yield a unitary porous body. The choice of catalyst is quite apparently dependent upon the reactants to which the composite body will be exposed. Typically, the catalytically active metal will be homogeneously or uniformly blended into the supporting structural material. Such practice is not necessary, however. For example, the catalyst may be preferentially deposited in a particular location within the supporting structure such that, where desired, catalysis can be metered to match a varying stream of effluent and/or reactants.

The most practical means for producing a uniform dispersion of catalytically active metal in, for example, the supporting structural metal is to utilize powdered starting materials which can be blended into an intimate mixture. Generally, metal powders having average particle diameters ranging between about 5-200 microns have been found operable. It has been observed that one factor influencing the porosity of the final composite body is the size of the metal particles. For example, large particle sizes, such as those closely passing through a No. 6 United States Standard Sieve (3360 microns) cannot be pressed or otherwise formed into integral bodies. Therefore, the metal powders will preferably pass a No. 100 United States Standard Sieve (149 microns) and, most preferably, the powders will pass a No. 325 United States Standard Sieve (44 microns). In any event, care must be exercised to avoid the use of metal powders of such small size as to hazard pyrophoricity.

In the practice of the present invention, a unitary composite structure exhibiting catalytic activity consisting essentially of catalytically inactive base metals which are integrally dispersed throughout said structure and wherein said base metals become catalytically active upon oxidation. The oxidation is achieved in situ, through air oxidation, through oxidizing agents, and/or a combination thereof.

Whereas any of the forming methods conventionally predetermined geometries, such as dry pressing, rolling, slip casting, and isostatic pressing, can be used in the present invention, because of the very extensive surface area presented to fluids by such structures, honeycombs formed through extrusion are of particular interest. However, regardless of the configuration of the body, it will be fired to a temperature and for a period of time sufficient to sinter the metal or ceramic powders into a strong, unitary structure having a total porosity with pores of predetermined dimensions that can be tailored to be operable in a desired application.

The parameters of the sintering operation are quite apparently dependent upon the materials involved and are selected to insure that catalytically-active metal is made integral with the supporting structures. Excessively high temperatures and/or long firing times must be avoided since such conditions can lead to products of very low porosity and/or containing pores of too small dimensions. At the opposite extreme, too low temperatures result in weak, poorly sintered bodies with pores of too large dimensions.

To enable the sintered composite to perform as a filter and/or to simultaneously permit access to the catalyst metal, total porosity and pore size must be maintained within critical regimes in order that the flow of fluids therethrough is not impaired. Those regimes are particularly important where the articles are exposed to exhaust gases from internal combustion engines, as filters for diesel engines, or for that matter filters to be used for molten metals. Thus, for a filtering type application, the inventive structures may exhibit a total porosity of about 25-75%, preferably about 20-60%, with pores having diameters ranging about 1-100 microns, preferably about 1-50 microns.

Very frequently a suitable organic and/or inorganic binder/vehicle is added to the mixture of metal or ceramic powders to aid in forming the powders into a desired shape and imparting strength to the green (unsintered) body. During the initial stages of the firing operation, this binder/vehicle will be burned out. That burnout can leave microchannels, pores, and minute passageways in the final structure which also further expose the catalyst to passing fluids.

When initially subjected to a stream of effluents, the base metal may exhibit very slight catalytic activity. As the porous composite body is continually subjected to the effluent stream and/or reactants, the catalytic activity of the base metal increases as it oxidizes to a level which is commonly recognized in the art as a efficient conversion rate. The mechanism underlying this phenomenon is based on the fact that the effluent stream oxidizes the base metal such that a thin skin of metal oxide is generated in situ, leaving the remainder of the base metal in the metallic state. It is this thin layer of metal oxide which actually produces the desired catalytic action.

Two other methods for generating this surface oxide film comprise: preoxidizing the base metal surface through exposure in a furnace to an oxidizing environment; and the preferred method of chemically oxidizing the base metal surface through contact with a suitable oxidizing agent, e.g., mineral acids such as $HNO_3$ and $H_2SO_4$.

Generally, a method to make a unitary composite structure comprises the steps of: a) mixing catalytically active and/or catalytically inactive metal with structural metal or ceramic powders with binder and water into a unified mass, b) shaping said mass into a geometrical body, and c) firing said body into a hard sintered porous structure.

The in situ process provides at least three very important advantages.

First, the underlying base metal provides fresh stock for the conversion of the metal to the metal oxide. Thus, the catalytic porous metal or ceramic body provides a dynamic unknown to the art; that is, it is able to regenerate the catalyst oxide during use if the oxide surface layer is abraded, ablated, or otherwise removed in some manner. This self-healing characteristic is of tremendous practical significance in permitting long term exposures to effluents Hitherto, when the conventional catalyst-coated substrate lost its coating in use, the entire substrate required replacement. With the inventive composite bodies, however, replacement may not be required when the surface catalyst is lost during use. Hence, as the surface erodes, fresh metal catalyst is exposed Accordingly, the catalytic action will continue until the supporting structure deteriorates and fails. This circumstance results in a body exhibiting catalytic activity of significantly increased lifetime.

Second, the use of the base metal in the metallic form provides a less toxic alternative to that currently practiced in the art, and the final structure is easier to fabricate.

Third, the oxide surface layer on a base metal is ordinarily quite fragile, subject to degradation and destruction resulting from normal handling procedures. In situ oxidation furnishes means for inserting the catalyst into a stream of effluents while avoiding the hazard of damaging the surface oxide layer. Once in place the catalyst becomes active. In contrast, the metal structure supplies excellent mechanical and thermal durabilities.

It will be appreciated by those skilled in the art, of course, that the precious metals perform as catalysts in their metallic state; they do not require a surface oxide and/or sulfide layer.

Several methods of using the structures of this invention are contemplated. The following methods of use are meant to be illustrative and not limiting. A method of converting NOx and SOx gases species wherein said gases are catalyzed by base metal oxides derived from the oxidation of base metals wherein said base metals are integrally dispersed throughout a porous sintered composite structure. It is contemplated that this method of conversion is ideal for the exhaust path of organically fueled power plants. An additional method of use contemplated is a method of converting carbon containing reactants wherein said conversion is catalyzed by base metal oxides derived from the oxidation of base metals wherein said base metals are integrally dispersed throughout a porous sintered composite structure. A third method contemplated as illustrative of the use of this invention is a method of converting carbon containing reactants wherein said conversion is catalyzed by precious metals wherein said precious metals are integrally dispersed throughout a porous sintered composite structure. And finally a method of use wherein silver metal is integral to the structure, oxidized and subsequently placed in a reactive vessel to catalyze organic reactions.

The following descriptive examples further illustrate specific structures contemplated by this invention and are meant for purposes of teaching the workings contemplated.

DESCRIPTION OF THE PREFERRED EMBODIMENT

In the specific examples recorded below, which examples must be deemed illustrative only and not limiting, the following general procedure was utilized in preparing the composite bodies:

First, the catalytically active and structural metal or ceramic powders were mixed with the binders/lubricants/dispersants (optionally, sintering aids may be added in this step to facilitate sintering);

Second, the resultant batch was admixed with sufficient water to form a plastic mass;

Third, the plastic mass was shaped into a body of a desired geometry;

Fourth, the body was dried to remove the water content; and thereafter

Fifth, the dried body was consolidated, as in sintering, to a unitary composite body consisting essentially of a catalytically active metal integrally combined with a supporting structural metal.

The binders/lubricants/dispersants were included to impart sufficient consistency, plasticity, and strength to the plastic mass to resist disintegration during the subsequent shaping process. Also, depending upon the overall size and configuration of the body shaped from the plastic mass, it may be necessary to initially fire the "green" (unsintered) body at a somewhat elevated temperature, e.g., 300°–500° C., in either oxidizing or reducing atmospheres, to remove the organic materials. Then the body is heated at a slow rate to the sintering temperature, preferably under a reducing, inert, or controlled atmosphere. Particularly in bodies of substantial bulk, the rapid elimination of the organic materials can hazard cracking, spalling, and other structural defects in the bodies.

Finally, the following examples specifically illustrate the production of honeycomb structures through extrusion since that construction is considered to be preferred for removing noxious gases from exhaust streams. However, it will be appreciated that other shapes formed through other methods are also contemplated in this invention.

EXAMPLE 1

About 960 grams of ferrotitanium (70% titanium, −325 mesh, Shieldalloy) and 240 grams of ferrotungsten (82% tungsten, −325 mesh), obtained from Shieldalloy Corporation, Newfield, N.J., were mechanically dry mixed with 96 grams of methylcellulose as temporary binder, 6 grams of zinc stearate as lubricant, and 7.2 grams of oleic acid as dispersant. That batch was charged into a Lancaster Laboratory Mix-Muller along with 195 ml distilled water and the resulting mass was mulled for 20 minutes to yield a plastic consistency. The plasticized mass was thereafter extruded into the form of 0.125" (~3.2 mm) diameter extrudates ("spaghetti"). The extrudates were collected and then passed through an extrusion die to form a cylindrical honeycomb structure having a 1" (25 mm) diameter and a length of 4' (1.2 m), with a cross section of 100, 200, or 400 cells/in² and a wall thickness of about 0.006 to 0.017 mils. The honeycombs were cut into 8" (20 cm) and subsequently dried in an oven operating at 100° C. The dried honeycombs were placed in a furnace and sintered to a unitary composite body by firing for 0.5 hour at 1125° C. in a reducing atmosphere composed of forming gas (92% $N_2$, 8% $H_2$). Alternatively, the honeycomb sections can be sintered in an inert atmosphere, such as argon, under the same firing conditions.

The surfaces of the honeycombs were oxidized by firing in air for 6 hours at 600° C. to produce catalytically active tungsten and iron oxide surface sites. The surface area of the catalytically active surface oxide, as measured by single point BET, was determined to be less than 1 m2/gram Alternatively, the surfaces of the honeycomb can be oxidized through contact with an acid, conveniently a mineral acid.

EXAMPLE 2

About 960 grams of the ferrotitanium powder (70% titanium, $-325$ mesh, Sheildalloy Corp), and 120 grams of the ferrotungsten powder (82% tungsten, $-325$ mesh, Shieldalloy Corp) and ferrovanadium powder alloy (50% vanadium, $-325$ mesh) described above were dry mixed with 96 grams of methylcellulose, 6 grams of zinc stearate, and 7.2 grams of oleic acid. That batch was charged into a Lancaster Mix-Muller along with 190 ml distilled water and the resulting mass was mulled for 20 minutes. The resultant plasticized mass was dried, extruded into spaghetti, the spaghetti extruded into a cylindrical honeycomb structure having a cross section of 100 cells/in$^2$ and a wall thickness of about 0.006 to 0.017 mils. The honeycomb was cut into sections and the sections dried and sintered in like manner to Example 1. Thereafter, the surfaces of the honeycombs were oxidized in accordance with that described in Example 1 to yield a surface area of catalytically active surface oxide, as measured by single point BET, that was less than 2 m2/gram.

EXAMPLES 3–8

Examples 3–8 were prepared in the same manner and utilizing the same proportions as reported for Example 1. Example 3 employed a combination of ferrotitanium (960 grams) and ferrovanadium (120 grams); Example 4 used ferrotitanium alone; Example 5 involved a chromium-tungsten alloy alone; Example 6 utilized ferrovanadium alone; Example 7 employed ferrotungsten alone; and Example 8 used ferrotitanium (960 grams) and chromium-tungsten alloy (120 grams). All of the alloys were purchased from Shieldalloy Corporation. Each of the sintered honeycombs was fired in air for 6 hours at 600° C. to generate catalytically active oxide surface sites.

EXAMPLE 9

In Example 9, 504 grams of Shieldalloy 50/50 Fe/Al powder ($-325$ mesh), 1296 grams of MH 300, Hoeganas Fe powder, and 15.3 grams of chloroplatinic nitrate solution (11.78 weight percent Pt) were combined with 1000 ml of distilled water. The mixture was rolled for several hours on a roller mill to ensure homogeneous mixture of the platinum solution throughout the mixture. The mixture was dried in an oven for several hours to remove the water. The mixture was next combined with 108 grams of methocel, 18 grams of zinc powder, 9 grams of zinc stearate, and 10.8 grams of oleic acid. The mixture was dry mixed in a Littleford mixer. Next, the mixture was placed in a muller and enough water added to plasticize to form into a batch. The plasticized batch was then extruded into spaghetti and then into a honeycomb form. The honeycombs were dried in an oven for several hours. The dried honeycombs were fired in an argon atmosphere for 2 hours at a sintering temperature of 1300° C.

EXAMPLE 10

In Example 10, 1800 grams of 316 stainless steel powder ($-325$ mesh, Shieldalloy) and 15.3 grams of a solution of chloroplatinic nitrate (11.78 weight percent Pt) were mixed. This mixture was combined with 1000 ml of distilled water. The mixture was rolled for several hours on a roller mill to ensure homogeneous mixture of platinum solution throughout the mixture. The mixture was dried in an oven for several hours to remove the water. The mixture was combined with 108 grams of methocel, 9 grams of zinc stearate, 10.8 grams of oleic acid and dry mixed. The blended material was placed in a muller with enough water added to plasticize to form a batch. The batch was then extruded into spaghetti and next extruded into a honeycomb form. The honeycombs were dried in an oven for several hours. The dried honeycombs were sintered under an argon atmosphere for two hours at 1200° to 1250° C.

EXAMPLE 11

In Example 11, 1620 grams of 316 stainless steel powder, 180 grams of ferrovanadium powder (approximately 40/60 Fe/V ratio, $-325$ mesh, Shieldalloy Corp), 108 grams of methocel, 9 grams of zinc stearate, and 10.8 grams of oleic acid were dry mixed. The mixture was placed in a muller with enough water added to plasticize the batch. The plasticized batch was extruded into spaghetti and the into honeycomb form. The honeycombs were dried in an oven for several hours The dried honeycombs were sintered under an argon atmosphere for two hours and sintered at 1200° to 1250° C.

EXAMPLE 12

In Example 12, 1620 grams of ferrovanadium powder (as in Example 11), 180 grams of copper powder (Alcan, $3\mu$) 108 grams of methocel, 9 grams of zinc stearate, and 10.8 grams of oleic acid were dry mixed. The mixture was placed in a muller with enough water added to plasticize the batch. The plasticized batch was extruded into spaghetti and then into honeycomb form. The honeycombs were dried in an oven for several hours. The dried honeycombs were sintered under an argon atmosphere for 2 hours at 1350 to 1400° C.

EXAMPLE 13

In Example 13, 1620 grams of ferrotitanium powder (as above), 180 grams of copper powder (Alcan, $3\mu$), 108 grams of methocel, 9 grams of zinc stearate, and 10.8 grams of oleic acid were dry mixed. The mixture was placed in a muller with enough water added to plasticize the batch. The plasticized batch was extruded into spaghetti and then into honeycombs. The honeycombs were dried in an oven for several hours. The dried honeycombs were sintered under an argon atmosphere for 2 hours and sintered at 1250° to 300° C.

EXAMPLE 14

In Example 14, 1620 grams of ferrotungsten powder (as above), 180 grams of copper powder (Alcan, $3\mu$), 108 grams of methocel, 9 grams of zinc stearate, 10.8 grams of oleic acid dry mixed. The mixture was placed in a muller with enough water added to plasticize the batch. The plasticized batch was extruded into spaghetti and then into a honeycomb form. The honeycombs were dried in an oven for several hours. The dried honeycombs were sintered under an argon atmosphere for 2 hours at a 1400° C. sintering temperature.

EXAMPLE 15

In Example 15, 1620 grams of chromium tungsten powder (70% chromium, −325 mesh, Shieldalloy Corp.), 180 grams of copper powder (Alcan, 3μ), 108 grams of methocel, 9 grams of zinc stearate, and 10.8 grams of oleic acid were dry mixed. The mixture was placed in a muller with enough water added to plasticize the batch. The plasticized batch was extruded into spaghetti and then into honeycomb form. The honeycombs were dried in an oven for several hours. The dried honeycombs were sintered under an argon atmosphere for 2 hours at a 1400° C. sintering temperature.

EXAMPLE 16

In Example 16, 1296 grams of ferrotitanium powder, 324 grams of chromium tungsten powder (as above), 108 grams of copper powder, 9 grams of zinc stearate, and 10.8 grams of oleic acid were dry mixed. The mixture was placed in a muller with enough water added to plasticize the batch. The plasticized batch was extruded into spaghetti and then into honeycomb form. The honeycombs were dried in an oven for several hours. The dried honeycombs were sintered under an argon atmosphere for 2 hours and sintered at 1200° C.

EXAMPLE 17

In Example 17, 1620 grams of ferrovanadium powder, 180 grams of nickel powder (Alcan, 3μ), 108 grams of methocel, 9 grams of zinc stearate, and 10.8 grams of oleic acid were dry mixed. The mixture was placed in a muller with enough water added to plasticize the batch. The plasticized batch was extruded into spaghetti and then into honeycomb form. The honeycombs were dried in an oven for several hours. The dried honeycombs were sintered under an argon atmosphere for two hours and sintered a 1200° C.

EXAMPLE 18

In Example 18, 1620 grams of ferrotitanium powder, 180 grams of nickel powder, 108 grams of methocel, 9 grams of zinc stearate, and 10.8 grams of oleic acid were dry mixed. The mixture was placed in a muller with enough water added to plasticize the batch. The plasticized batch was extruded into spaghetti and then into honeycomb form . The honeycombs were sintered under an argon atmosphere for 2 hours and sintered at 1300° C.

EXAMPLE 19

In Example 19, 1620 grams of ferrotungsten powder, 180 grams of nickel powder, 108 grams of methocel, 9 grams of zinc stearate, and 10.8 grams of oleic acid were dry mixed. The mixture was placed in a muller with enough water added to plasticize the batch. The plasticized batch was extruded into spaghetti and then into honeycomb form. The honeycombs were sintered under an argon atmosphere for 2 hours and sintered at 1250° C.

EXAMPLE 20

In Example 20, 1620 grams of chromium tungsten powder, 180 grams of nickel powder, 108 grams of methocel, 9 grams of zinc stearate, and 10.8 grams of oleic acid were dry mixed. The mixture was placed in a muller with enough water added to plasticize the batch. The plasticized batch was extruded into spaghetti and then into honeycomb form. The honeycombs were dried in an oven for several hours. The dried honeycombs were sintered under an argon atmosphere for 2 hours and sintered at 1400° C.

EXAMPLE 21

In Example 21, 1296 grams of ferrotitanium powder, 324 grams of chromium tungsten powder, 180 grams of nickel powder, 9 grams of zinc stearate, and 10.8 grams of oleic acid were dry mixed. The mixture was placed in a muller with enough water added to plasticize the batch. The plasticized batch was extruded into spaghetti and then into honeycomb form. The honeycombs were dried in an oven for several hours. The dried honeycombs were sintered under an argon atmosphere for 2 hours at 1250° C.

EXAMPLE 22

In Example 22, 800 grams of silver powder (fine Ag powder D from Degussa Metz Metallurgical Corp) was mixed with 48 grams of methocel and high-sheer mixed in a Littleford mixer. The mixture was placed in a muller and enough water added to plasticize the mixture. The plasticized batch was then extruded into spaghetti and then into honeycomb form. The honeycombs were dried in an oven for several hours. The dried honeycombs were then fired in air for 0.5 hours at 500° C. and at 600° C.

EXAMPLE 23

In Example 23, 375 grams of fine silver powder (Degussa Metz Metallurgical Corp.), 375 grams of α-alumina powder (Alcan C-701-RGE, −325 mesh) and 45 grams of methocel were dry mixed in a Littleford mixer. The blended material was placed in a muller and enough water added to plasticize the mixture. The plasticized batch was then extruded into spaghetti and then into honeycomb form. The honeycombs were dried in an oven for several hours. The dried samples were then fired in air for 0.5 hours at 500° C. and at 600° C.

EXAMPLE 24

In Example 24, 375 grams of fine silver powder (Degussa Metz Metallurgical Corp), 375 grams of α-alumina powder (Alcoa T-64, −100 mesh), and 45 grams of methocel were mixed in a Littleford mixer. The blended material was placed in a muller and enough water added to plasticize the mixture. The plasticized batch was then extruded into spaghetti and then into honeycomb form. The honeycombs were dried in an oven for several hours. The dried samples were then fired in air for 0.5 hours at 500° C. and at 600° C.

EXAMPLE 25

In Example 25, the following powders were mixed in weight percent: 35.1% kaolin clay, 27.2% α-alumina (−325 mesh), 18.8% fused quartz (−325 mesh), 18.8% iron-vanadium metal powder, 6% methylcellulose, and 0.5% sodium stearate. The powders were intensively mixed and then plasticized with 20 weight percent water in a mix-muller. The plasticized batch was preextruded 2-3 times in the form of ⅛ inch (3.175 mm) diameter extrudates and then cellular structures were extruded, 200 squares/in² with 0 015 inch (.38mm) thick walls. The structures were dried and then fired in an argon atmosphere at 1400° C. for 6 hours. The resultant samples were porous, hard, and strong. The iron-vanadium metal was partially oxidized with nitric acid, dried and then tested for selective catalytic reduction (SCR) of NOx.

EXAMPLE 26

In Example 26, the following powders were mixed in weight percent: 26.8% kaolin clay, 20.7% α-alumina (−325 mesh), 14.3% fused quartz (−325 mesh), 38.2% iron vanadium metal powder, 6% methylcellulose, and 0.5 sodium stearate. The powders were intensively mixed and then plasticized with 18 weight percent water in a mix-muller. The plasticized batch was then processed as in Example 25.

EXAMPLE 27

In Example 27, the following powders were dry mixed in weight percent: 86.5% titania (Degussa P25), 18.6% silicone resin (Dow Corning), 6% methylcellulose, and 5% ironvanadium metal powder. The mixture was plasticized with 4.6 weight percent water and 24.6 weight percent isopropyl alcohol. The extrusion was performed as in Example 25 and the samples fired at 500° C., for 6 hours in an air atmosphere. The presence of air resulted in at least partial oxidation of the iron-vanadium.

EXAMPLE 28

In Example 28, the following powders were dry mixed in weight percent: 77.5% titania, 8.6% silica (Cabosil EH-5), 6% methylcellulose, and 5% iron-vanadium metal powder. The powders were intensively mixed, some of the 77 weight percent water was added in the mix-muller and 32.6 weight percent tetra isopropyl titanate was added. When the titanate was brought in contact with the water it hydrolyzed. Finally, the remaining water was added and the extrusion proceeded as in Example 27. Example 28 was fired at 600° C. for 6 hours.

EXAMPLE 29

In Example 29, the following powders were dry mixed in weight percent: 76.5% titania, 8.5% silica, 6% methylcellulose, and 15% iron-vanadium metal powder. The powders were dry mixed with 72.5% water and 32.3% tetra isopropyl titanate added as in Example 28. Example 29 was processed as in Example 28 except that Example 29 was fired at 500° C.

EXAMPLE 30

In Example 30, the following powders were dry mixed in weight percent: 63% titania, 7% silica, 30% iron-vanadium metal powder, and 6% methylcellulose. The powders were dry mixed with 65% water and 26.6% tetra isopropyl titanate added as in Example 29. The remaining processing was as in Example 29.

Examples 25 through 30 were tested for percent NOx conversion and were found to convert from 80 to 95%, at a temperature in ° C. of from 254 to 531, and a space velocity of from 15,000 to 30,000 changes per hour.

In Table I is shown sintering data on Examples 9 through 21. The heating rate was 100° C./hr up to the sintering temperature with a 2 hour hold followed by a 100° C./hr cool down rate. As sintering aids 10% copper or 10% nickel was coextruded with the alloy powders. Good sintering was obtained for all samples between 1250° C. and 1400° C. Metal monoliths containing nickel as sintering aid tended to shrink or soften with shrinkage.

TABLE I

| Example | Sintering Temperature, °C. | Sinters |
|---|---|---|
| 9 | 1200 | no |
|   | 1300 | yes |
| 10 | 1200 | yes |
|   | 1250 | yes, very good |
|   | 1300 | yes shrinks |
| 11 | 1200 | yes |
|   | 1250 | yes, very good |
|   | 1300 | yes, shrinks |
| 12 | 1300 | no |
|   | 1350–1400 | yes |
| 13 | 1000 | no |
|   | 1200 | almost |
|   | 1250 | yes |
| 14 | 1400 | yes |
| 15 | 1400 | yes |
| 16 | 1000 | no |
|   | 1200 | yes |
|   | 1350 | yes, shrinks |
| 17 | 1300 | yes |
|   | 1350 | yes, shrinks |
| 18 | 1000 | no |
|   | 1200 | almost |
|   | 1300 | yes |
|   | 1350 | yes |
| 19 | 1200 | almost |
|   | 1250 | yes |
|   | 1300 | yes, shrinks |
|   | 1350 | yes, shrinks |
|   |   | yes, shrinks |
| 20 | 1200 | no |
|   | 1250 | no |
|   | 1300 | no |
|   | 1400 | yes |
| 21 | 1250 | yes |

The results for NOx conversions are shown in Table III. These sintered honeycomb, Examples 1-5, were tested for NOx conversion efficiency using conventional laboratory testing apparatus at space velocities of 7500 and 15,000 changes/hour with a simulated flue gas mixture consisting of 1000 ppm NH₃ and 1000 ppm NO with additions of 5% O₂ and H₂O. The table below records the space velocity (Sp. Vel) in changes/hour; the percent NO$_x$ conversion (NO$_x$), and the temperature in ° C. (Temp.) at which the percent NO$_x$ conversion occurs.

The sintered metal monoliths of Examples 9-21 were tested for efficiencies of NO conversion using SCR. Reaction conditions are shown in Table II.

TABLE II

| NO | 1000 ppm |
|---|---|
| NH₃ | 1000 ppm |
| O₂ | 5% |
| H₂O | 10% |
| N₂ | balance |
| Temperature | 150–600° C. |
| Space Velocity | 30,000/hr |

Under normal reaction conditions most SCR catalysts exhibit a bell shaped curve for NO conversion vs. temperature. In this study many of the metal monoliths exhibited broad curves over the entire temperature range of interest. This may be due to incomplete oxidation of the metal surface to the oxide.

Samples treated with dilute nitric acid gave higher NO conversions. Acid treatment produces a more highly oxidized surface. The greater the oxidation of the surface the higher the catalytic activity. Examples 11, 19, and 21 were treated with a 2 to 1 concentrated $HNO_3$ to distilled water ratio. The results of the NO conversions are shown in Table IV.

TABLE III

| Example | Sp. Vel. | $NO_x$ | Temp. |
|---------|----------|--------|-------|
| 1 | 15,000 | 84 | 400° |
| 1 | 7,500 | 95 | 375° |
| 2 | 15,000 | 68 | 400° |
| 3 | 15,000 | 82 | 400° |
| 3* | 15,000 | 70 | 370° |
| 4 | 30,000 | 44 | 240° |
| 5 | 30,000 | 83 | 378° |

*The surfaces of this section of honeycomb were not preoxidized by firing in air. Rather, the surfaces became oxidized from the flue gas mixture passing therethrough.

TABLE IV

| Example | % NO converted | Temperature |
|---------|----------------|-------------|
| 9 | <20 | All Temps |
| 10 | 62–67 | 389–458 |
| 11 | 68–73 | 379–433 |
| 13 | 25–27 | 399–445 |
| 16 | 25–30 | 430–480 |
| 18 | 22–25 | 450–500 |
| 19 | 63–67 | 375–480 |
| 20 | <20 | All Temps |
| 21 | 63 | 280–301 |

It is contemplated that the metal catalytic monoliths can be advantageously used to catalyze any reaction requiring a high surface area structure and any one or more of the catalysts herein disclosed. For example, the sintered silver honeycombs may be advantageously used to catalyze ethylene to ethylene oxide. A supported silver catalyst has also been found to be useful in the catalysis of methanol to formaldehyde.

We claim:

1. A unitary composite structure exhibiting catalytic activity consisting essentially of a single and/or plurality of catalytically active precious metals and/or base metals, said base metals become catalytically active upon oxidation and/or sulfidation, said precious and/or base metals integrally combined with a porous hard sintered support structure wherein said structure is formed essentially from structural metal and/or structural ceramic 2. The structure according to claim 1 wherein said base metal catalyst is selected from the group consisting of chromium, cobalt, copper, iron, manganese, molybdenum, nickel, niobium, tantalum, titanium, tungsten, vanadium, zirconium, rare earth metals and alloys therebetween, and mixtures thereof.

3. The structure according to claim 1 wherein said precious metal catalyst is selected from the group consisting of gold, iridium, osmium, palladium, platinum, rhodium, ruthenium, silver, and mixtures thereof.

4. The structure according to claim 1 wherein said supporting structure is selected from the group consisting of aluminum, iron, nickel, steels, titanium, stainless steels, alloys therebetween and/or combinations thereof.

5. The structure according to claim 1 wherein said supporting structure is selected from the group consisting of cordierite, mullite, alumina, lithium aluminosilicates, titania, zircon, feldspars, quartz, fused silica, kaolin clay, aluminum titanate, silicates, aluminates, and mixtures thereof.

6. The structure according to claim 1 wherein said structure is a filter.

7. The filter according to claim 6 wherein said filter is a diesel particulate filter.

8. The filter according to claim 6 wherein said filter is a molten metal filter.

9. The structure according to claim 1 having a porosity of about 25–75% with pores having diameters ranging between about 1–100 microns.

10. The structure according to claim 1 having a porosity of about 20–60% with pores having diameters ranging between about 1–50 microns.

11. The structure according to claim 1 having a honeycomb configuration.

12. A unitary hard sintered porous composite structure exhibiting catalytic activity said catalytic activity derived essentially from base metals integrally dispersed throughout said structure, wherein said base metals become catalytically active upon oxidation, wherein said oxidation is achieved in situ, through air oxidation, through oxidizing agents, and/or a combination thereof whereby a metal oxide layer is formed on said base metals wherein said structure is formed essentially from structural metal and/or structural ceramic.

13. The structure as in claim 12 wherein said metal oxide is regenerated.

14. The structure as in claim 12 wherein said metal oxide is regenerated in situ.

15. A method to make a unitary composite structure comprising:
 (a) mixing catalytically active and/or catalytically inactive metal and structural metal and/or structural ceramic powder with binder and water into a unified mass,
 (b) shaping said mass into a geometrically body,
 (c) firing said body into a hard sintered porous structure.

16. The method as in claim 15 wherein said catalytically inactive metal is oxidized after said firing, whereby oxidation makes said catalytically inactive metal, active.

* * * * *

UNITED STATES PATENT AND TRADEMARK OFFICE
CERTIFICATE OF CORRECTION

PATENT NO. : 4,912,077                                    Page 1 of 2

DATED : March 27, 1990

INVENTOR(S) : Irwin M. Lachman, Mallanagouda D. Patil, Jimmie L. Williams and Raja R. Wusirika It is certified that error appears in the above-identified patent and that said Letters Patent is hereby corrected as shown below:

Col. 1, line 26 insert "." after "thereof"

Col. 1, line 28 insert "." after "benefits"

Col. 1, line 32 insert "." after "states"

Col. 2, line 52 insert "." after "thereof"

Col. 4, line 8 before "predetermined" insert "employed in shaping powder mixtures into bodies of"

Col. 4, line 56 "a" should be "an"

Col. 5, line 20 insert "." after "effluents"

Col. 5, line 26 insert "." after "exposed"

Col. 7, line 14 "m2/gram" should be "$m^2$/gram."

UNITED STATES PATENT AND TRADEMARK OFFICE
CERTIFICATE OF CORRECTION

PATENT NO. : 4,912,077

DATED : March 27, 1990

INVENTOR(S) : Irwin M. Lachman, Mallanagouda D. Patil, Jimmie L. Williams and Raja R. Wusirika It is certified that error appears in the above-indentified patent and that said Letters Patent is hereby corrected as shown below:

Col. 8, line 35 the first "the" should be "then"

Col. 8, line 36 insert "." after "hours"

Col. 8, line 62 "300°C" should be "1300°C"

Col. 11, line 4 "0 015" should be "0.015"

Col. 11, line 4 ".38mm" should be ".381mm"

Col. 11, line 26 "ironvanadium" should be "iron-vanadium"

Col. 11, line 27 "4.6" should be "24.6"

Signed and Sealed this

Thirty-first Day of August, 1993

BRUCE LEHMAN

*Attest:*

*Attesting Officer*     *Commissioner of Patents and Trademarks*